United States Patent [19]
Hall et al.

[11] Patent Number: 5,251,978
[45] Date of Patent: Oct. 12, 1993

[54] DRIVING DEVICE FOR A VORTEX MIXING APPARATUS

[75] Inventors: Richard C. Hall; Marcus A. Lewis-Stevenson, both of Abingdon, United Kingdom

[73] Assignee: Bellhouse Technology Limited, Abingdon, United Kingdom

[21] Appl. No.: 838,457

[22] Filed: Mar. 11, 1992

[30] Foreign Application Priority Data

Sep. 11, 1989 [GB] United Kingdom ................ 8920545

[51] Int. Cl.$^5$ ...................... B01F 11/00; B01D 65/08
[52] U.S. Cl. .................................. 366/198; 366/203; 366/275; 366/259; 366/268
[58] Field of Search ............... 366/197, 198, 203, 242, 366/255, 256, 257, 259, 267, 268, 275; 210/637, 646, 321.67, 321.76, 321.72, 456, 493.1, 321.87, 500.36

[56] References Cited

U.S. PATENT DOCUMENTS

| | | | |
|---|---|---|---|
| 3,860,218 | 1/1975 | Hürlimann | 366/268 |
| 4,463,875 | 8/1984 | Tepic | 222/82 |
| 4,832,500 | 5/1989 | Brunold et al. | 366/268 |

FOREIGN PATENT DOCUMENTS

632127 9/1963 Belgium .
2152452 4/1973 France .
2158118 6/1973 France .
WOA8804318 6/1988 PCT Int'l Appl. .

*Primary Examiner*—Harvey C. Hornsby
*Assistant Examiner*—Reginald L. Alexander
*Attorney, Agent, or Firm*—Baker & Daniels

[57] ABSTRACT

A driving device for a vortex mixing apparatus comprises holders for holding a mixing unit of a type having at each opposite end a pumping diaphragm for imposing a pulsatile flow on a liquid passing through a primary channel in the unit. Two pistons are each arranged to cooperate with a respective one of the diaphragms and to reciprocate between a retracted position clear of the unit and an extended position in which it extends into a housing of the unit and compresses the respective diaphragm. Driving mechanisms are normally arranged to reciprocate the pistons in phase at the same frequency such that when one piston is moving from its retracted position to its extended position the other is moving from its extended position to its retracted position and vice versa. Control mechanisms are arranged, upon stopping of the driving mechanisms, to cause both pistons to adopt retracted positions so that the unit may be inserted into, and removed from the holders without interference from the pistons.

20 Claims, 5 Drawing Sheets

DRIVING DEVICE FOR A VORTEX MIXING APPARATUS

BACKGROUND OF THE INVENTION

The invention relates to a vortex mixing apparatus in which a fluid, usually a liquid, is passed with a pulsatile, and preferably reversing, flow, but with a mean flow, through a conduit which has a configuration which causes vortices to be set up in the fluid.

An example of such an apparatus, for effecting the transfer of heat or mass from a primary channel to a secondary channel through a transfer membrane, is shown in our WO 88/04318. In such apparatus, a vortex mixing unit houses the heat or mass transfer membrane which separates the two channels and is provided with an array of hollows in its surface facing into the primary channel. Pumping diaphragms, in communication with the primary channel are provided at each end of the unit and are engaged by respective reciprocating pistons of a driving device. As a result one fluid passing through the primary channel is caused to form transient vortices, as described in GB-A-1442754, which enhances contact between the one fluid and the membrane.

The production of vortices in a liquid in a vortex mixing unit may also be used to promote thorough mixing of the components of a fluid, for example to promote a chemical reaction between components; or to promote contact between the fluid and a component such as an affinity ligand immobilised on a support.

If the vortex mixing apparatus has a removable mixing unit with pumping diaphragms at each end, it has been appreciated by the inventors that problems arise during the loading and unloading of the unit. For efficient pumping of the diaphragms by the pistons, each piston must reciprocate between a retracted position clear of the mixing unit housing and an extended position in which it compresses its respective diaphragm, but such that the mean point of the reciprocation is situated within the unit housing. Removal or insertion of the unit into the apparatus is then hampered by interference from the pistons, since the mean separation of the pistons is smaller than the gap required for the unit to pass through. Thus, to load or unload a unit is difficult, particularly for an unskilled operator.

SUMMARY OF THE INVENTION

In accordance with the invention, a driving device for a vortex mixing apparatus comprises means for holding a mixing unit of a type having at each opposite end a pumping diaphragm for imposing a pulsatile flow on a liquid passing through a primary channel in the unit; two pistons, each arranged to cooperate with a respective one of the diaphragms and reciprocatable between a retracted position clear of the unit and an extended position in which it extends into a housing of the unit and compresses the respective diaphragm; driving means normally arranged to reciprocate the pistons in phase at the same frequency such that when one piston is moving from its retracted position to its extended position the other is moving from its extended position to its retracted position and vice versa; and control means arranged, upon stopping of the driving means, to cause both pistons to adopt retracted positions so that the unit may be inserted into, and removed from the holding means without interference from the pistons.

The invention thus provides a solution to the problem outlined above, since the pistons are automatically held at their maximum separation when stopped, thus leaving a space for the unit to pass through upon loading or unloading.

It is advantageous if the control means comprises at least one optical sensor associated with a respective piston for sensing the retracted position of the piston. In this way, when at least one of the pistons is detected in a retracted position, its drive is stopped.

In one construction one piston is driven and, the two pistons are spring loaded, e.g. by a coiled spring, towards one another to a normal working separation so that the second piston follows the driven piston. Upon stopping of the driving means, the control means may first impede the second piston in its retracted position and then allow the one piston to move and stop in its retracted position. Alternatively, upon stopping of the one piston, the second piston may be moved away by, e.g. a solenoid.

In a preferred arrangement, the driving means comprises two drive motors each arranged to drive a respective one of the pistons, e.g. by a separate crank assembly. This has the advantage that the pistons may be operated independently of one another, and the pistons need not be coupled by any kind of spring loaded means, thus saving energy which may be lost through the work needed to be done against the spring biasing force.

With this arrangement, each motor may be associated with a respective optical sensor, one of which senses the retracted position of one piston and the other of which senses both the retracted and the extended positions of the other piston, and may include means responsive to the sensors for monitoring that both pistons move in phase during normal working and that both pistons are stopped in their retracted positions. This has the advantage that both pistons may be controlled very accurately since the motors, particularly if they are stepping motors, may have a very rapid response to their respective sensors.

Preferably, one sensor comprises a fixed light transmitter and receiver assembly cooperating with a flag or window of an element rotating with the respective motor, and the other sensor comprises a pair of fixed light transmitter and receiver assemblies cooperating with a flag or window of an element rotating with its respective motor.

BRIEF DESCRIPTION OF THE DRAWINGS

A vortex mixing apparatus incorporating a driving device in accordance with the invention is illustrated by way of example in the accompanying drawings, in which.

DESCRIPTION OF THE PREFERRED EMBODIMENT

Figure 1:
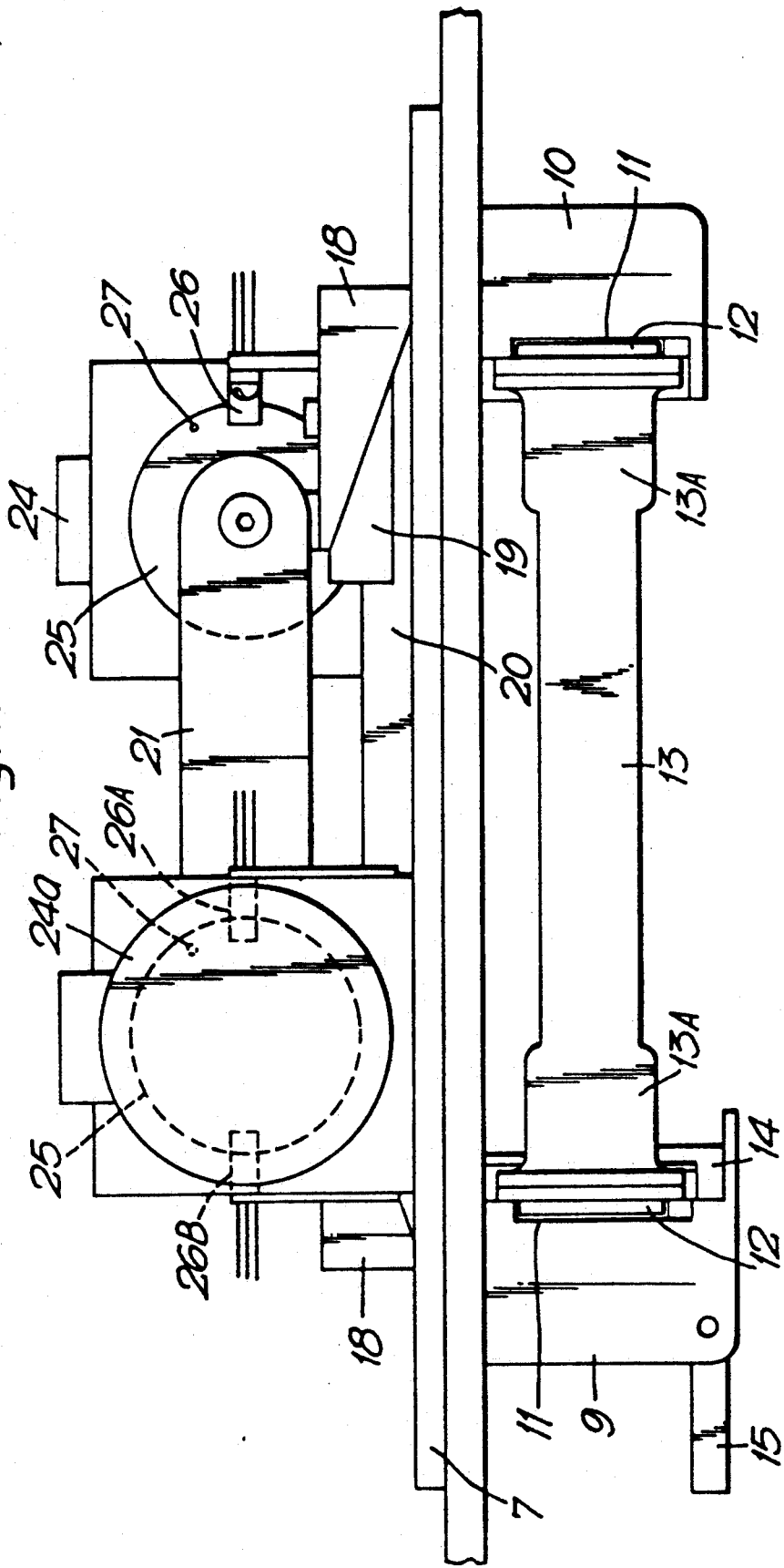
FIG. 1 is a plan.
Figure 2:
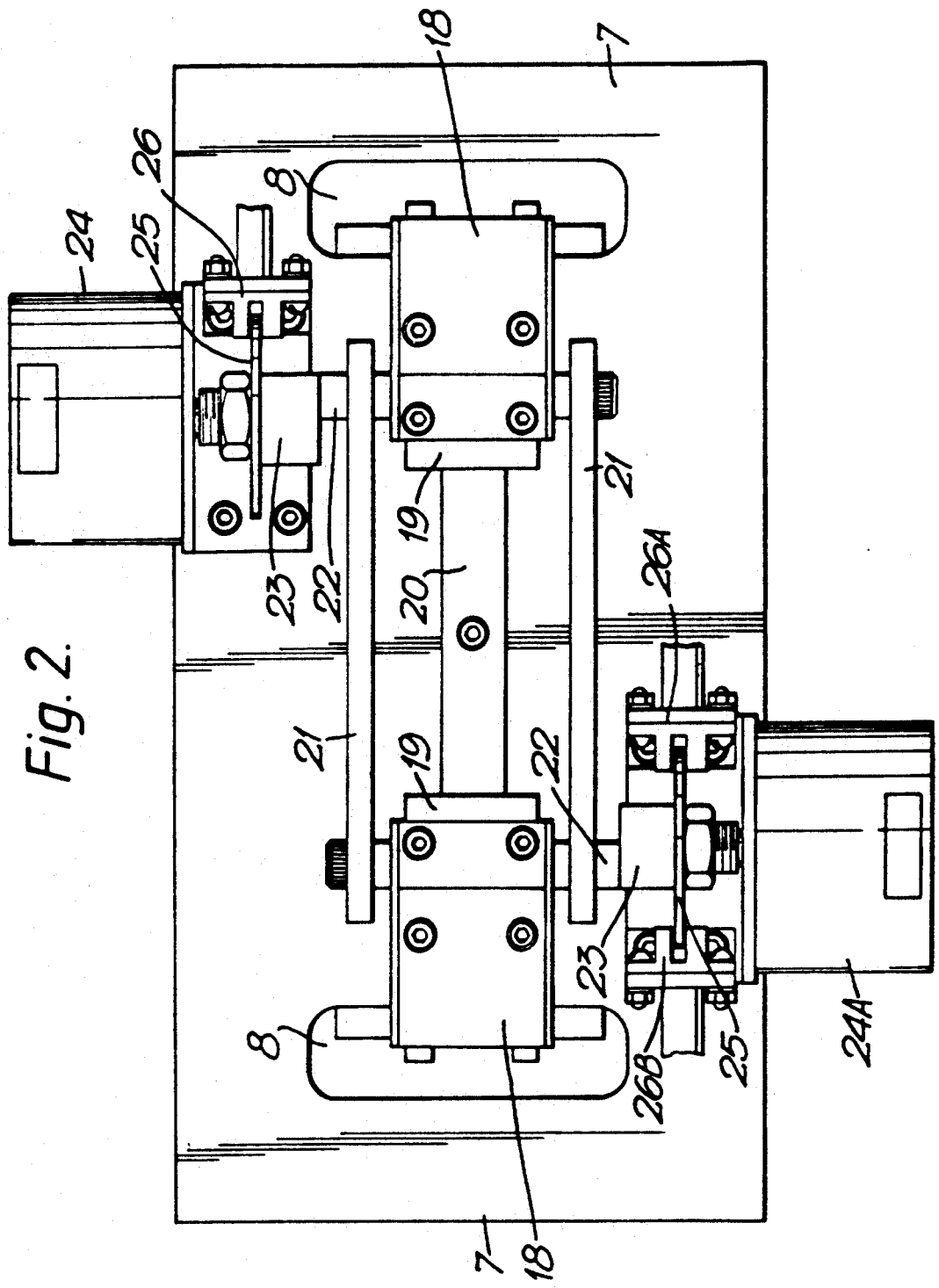
FIG. 2 is a rear elevation.
Figure 3:
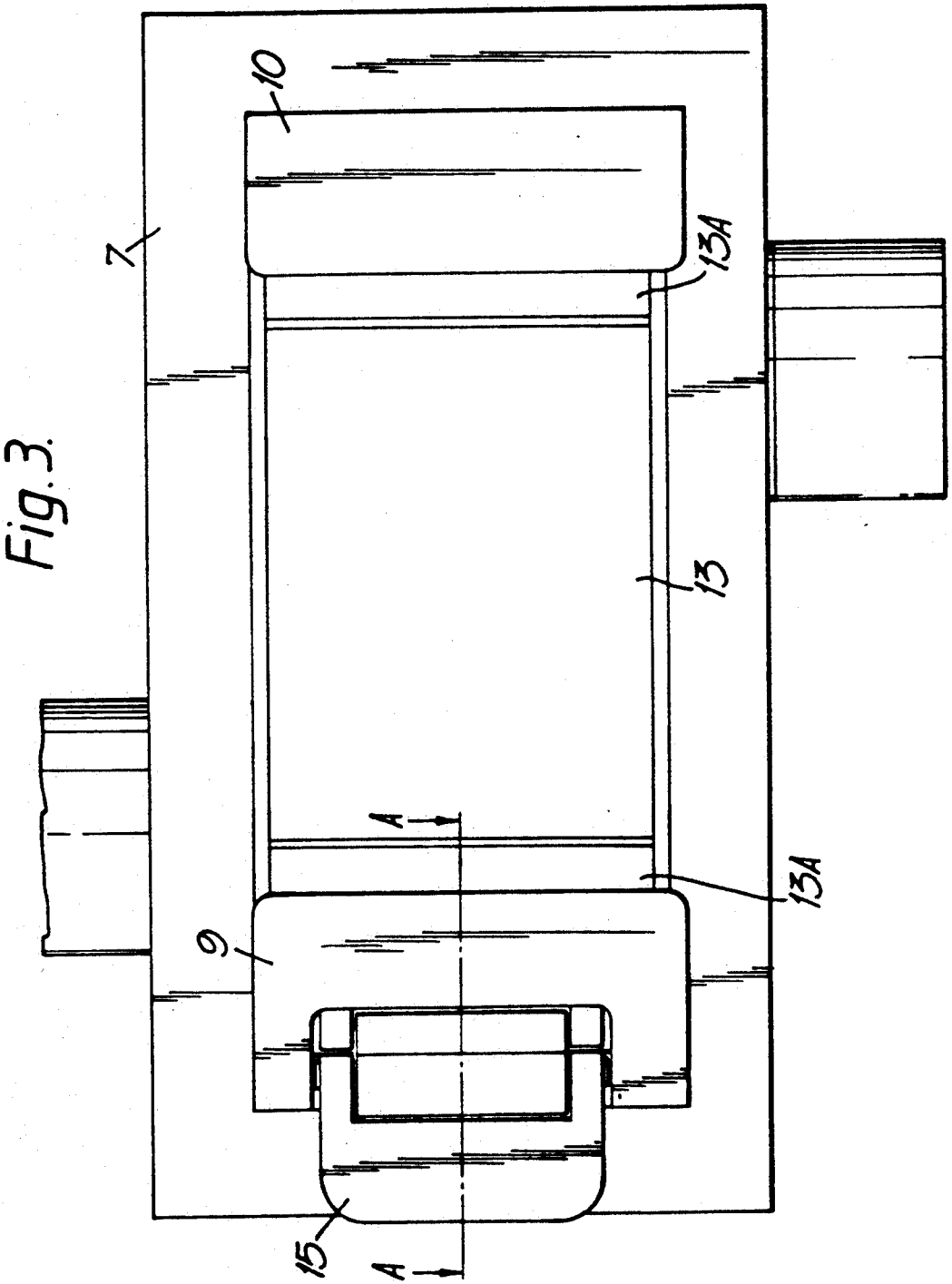
FIG. 3 is a front elevation.

The driving unit of the apparatus comprises a support plate 7 which is fixed with its plane vertical and the front of which may form a fascia for the apparatus. The plate is formed with two vertically elongate holes 8 and a pair of hollow holders 9 and 10 are mounted over the holes 8 on the front of the plate 7. Each of these holders has top and bottom recess portions 11 for receiving and locating complementary projecting portions 12 on the ends of a vortex mixing unit 13. The mixing unit is loaded into the holders by being lowered so that the projections 12 pass through the open tops of the upper recesses 11 until the lower projections 12 come to rest on bases of the lower recesses 11. A toggle latch 14, which is mounted on the holder 9, is then closed from its FIG. 4 position to its FIG. 5 position, by swinging of its handle 15, so that a flange 16 on the adjacent end of the mixing unit 13 is clamped to the holder 9. This is sufficient to hold the unit 13 rigidly in the apparatus.

Although not directly relevant to the present invention, the vortex mixing unit 13 is shown as having a generally flat rectangular housing with enlarged manifold portions 13a at each end. The unit may be as described more fully in our WO 88/04318 and consist of a central primary channel separated from two secondary channels by two filter membranes, each of which is shaped to present an array of hollows into the primary channel. Pipes are coupled to the manifold portions and communicate with respective ones of the channels to allow liquid to flow through the primary channel, and another liquid to flow through the secondary channel, or a filtrate to flow out of the secondary channel. In the case of plasmapheresis, the first liquid would be blood and the filtrate a concentration of blood cells.

Figure 4:
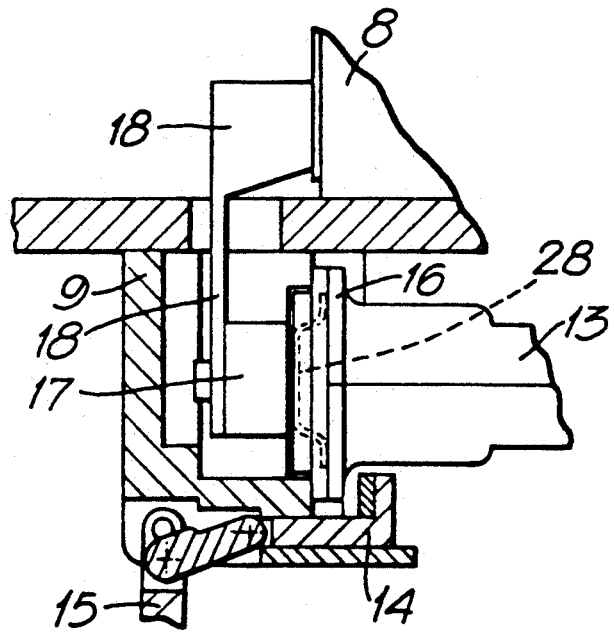
FIGS. 4 and 5 are sections taken on the line A—A in FIG. 3 but showing different positions of a clamp; and,
FIG. 6 is a partial end elevation.
Figure 5:
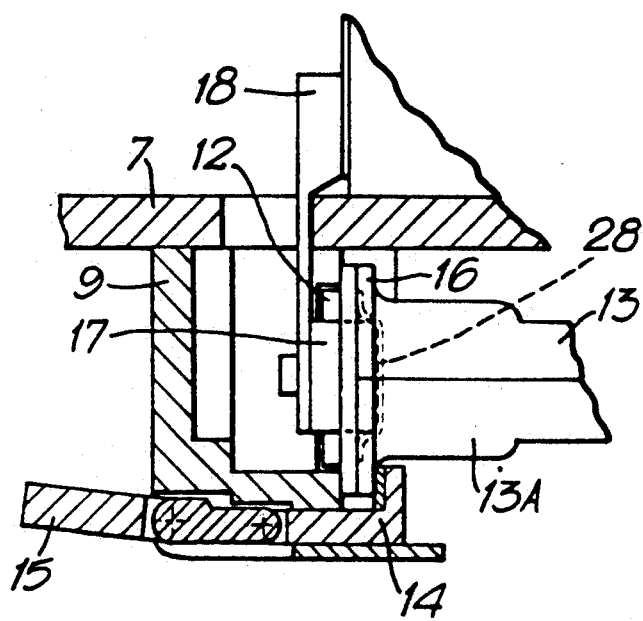
Figure 6:
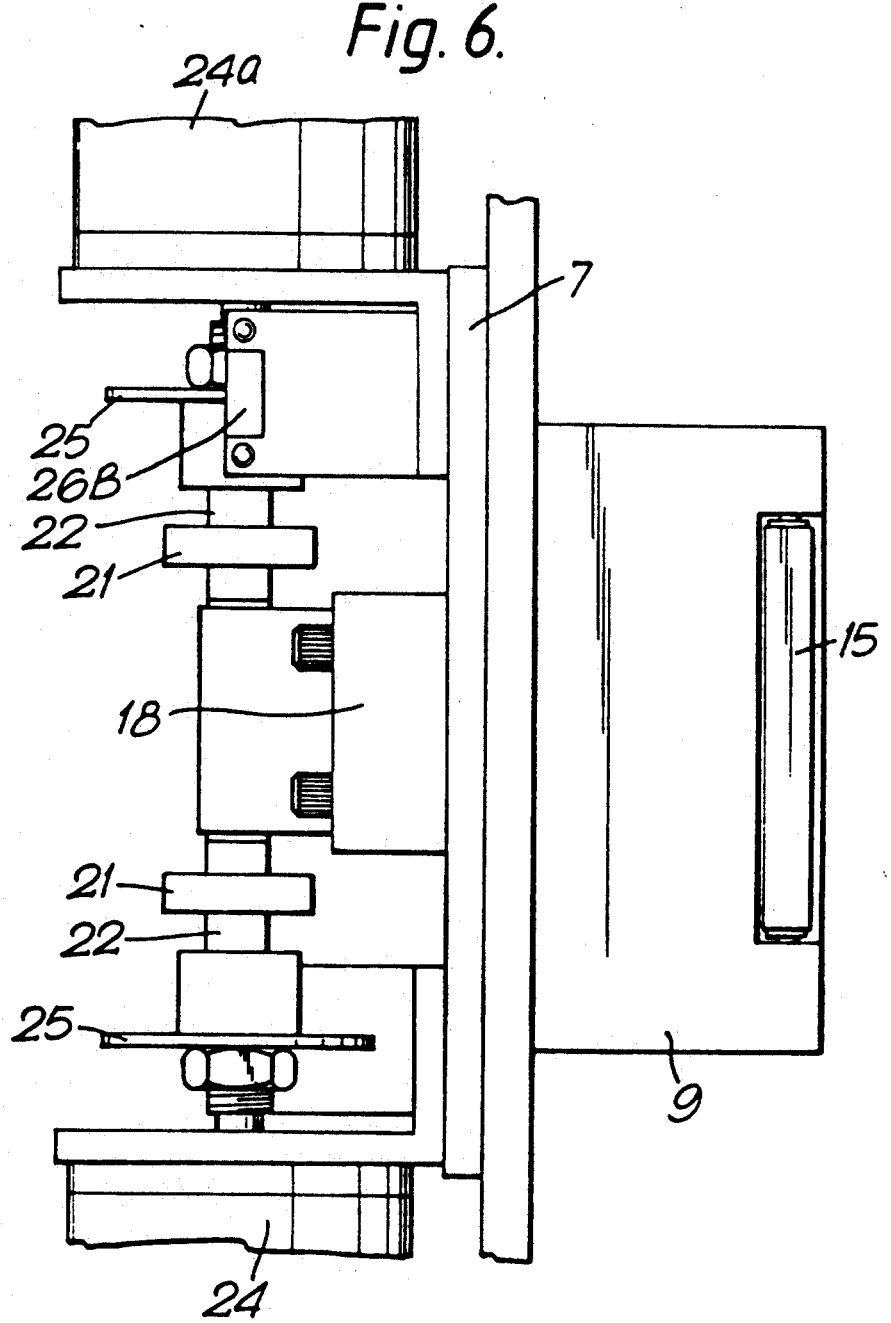

In order to promote the vortex mixing in the primary channel, a reciprocating flow is superimposed on the mean flow of the liquid flowing through the primary channel and for this purpose the unit 13 has at each end, exposed within in a central recess portion of its housing, a flexible diaphragm 28 in communication with the primary channel. These two diaphragms are alternately compressed by pistons 17, which work within the hollow holders 9, 10 and are carried on arms 18 which extend through the holes 8 where they are fixed to respective reciprocating sliders 19. In FIG. 4, the piston 17 is shown in its fully retracted position, in which it is wholly to the left of the projection 12, and FIG. 5 shows the piston 17 in its fully extended position. The same situation obtains with the other piston 17 at the other end of the unit 13.

The sliders 19 move to and fro via linear bearings on a fixed slideway 20 and each is connected by a connecting rod 21 to a crank pin 22 on a driving shaft 23 of a respective motor 24, 24A. It follows that as the motors 24, 24A rotate, the sliders 19 and hence the pistons 17 move to and fro although driven independently of one another.

In order to ensure that, during normal operation, the two pistons 17 move to and fro together, so that as one is compressing its diaphragm 28, the other is releasing the compression on its diaphragm, the operation of the two motors is synchronised. This is achieved by sensor disks 25 which are fixed on the respective motor shafts 23. Each disk is formed adjacent to its periphery with a window 27 which can be sensed, in the case of the motor 24, by a light transmitter and receiver assembly 26 which embraces the edge of the disk and has on one side of the disk a light source which can be sensed by a photodetector on the other side of the disk when the window passes the assembly. A pulse is therefore obtained from the photodetector on each revolution of the motor and disk, when the corresponding piston is in its retracted position.

The other motor 24A is similarly fitted with a disk 25 with a window but in this case there are two optical assemblies 26A, 26B. Each is like the assembly 26, but they are positioned 180° apart, so that the assembly 26A produces a pulse when the corresponding piston 17 is in its extended position and the assembly 26B produces a pulse when the corresponding piston 17 is in its retracted position.

The assemblies are connected to logic circuitry controlling the motors 24, 24A, which are quick response stepping motors and can be stopped instantaneously in a desired position.

During normal operation, the circuitry ensures that the pistons move to and fro together by ensuring that pulses are received from the assemblies 26 and 26A simultaneously. If there is any discrepancy, the motor 24 is stopped upon reception of the next pulse from the assembly 26 and the motor 24A is stopped upon reception of the next pulse from the assembly 26B. Both pistons are then in their retracted position. The motor 24A is then automatically restarted and upon receipt of the first pulse upon the assembly 26A, the motor 24 is restarted whereupon the pistons should operate in phase.

When it is desired to stop the drive, for example to replace the unit 13, the circuitry reproduces the control signals to the motors as though they were running out of phase, i.e. the motor 24 is stopped upon reception of the next pulse from the assembly 26 and the motor 24A is stopped upon reception of the next pulse from the assembly 26B. Both pistons will then be "parked" in their retracted positions free of the projections 12 on the unit 13, and hence allowing unobstructed removal of the unit from the holders 9, 10.

What is claimed is:

1. A driving device for a vortex mixing apparatus comprises means for holding a mixing unit of a type having at each opposite end a pumping diaphragm for imposing a pulsatile flow on a liquid passing through a primary channel in the unit; two pistons, each arranged to cooperate with a respective one of the diaphragms and reciprocatable between a retracted position clear of the unit and an extended position in which it extends into a housing of the unit and compresses the respective diaphragm; driving means normally arranged to reciprocate the pistons in phase at the same frequency such that when one piston is moving from its retracted position to its extended position the other is moving from its extended position to its retracted position and vice versa; and control means arranged, upon stopping of the driving means, to cause both pistons to adopt retracted positions so that the unit may be inserted into, and removed from the holding means without interference from the pistons.

2. A device according to claim 1, in which the control means comprises at least one optical sensor associated with a respective piston for sensing the retracted position of the piston.

3. A device according to claim 1, in which the driving means comprises two drive motors each arranged to drive a respective one of the pistons.

4. A device according to claim 2, in which each motor is associated with a respective optical sensor, one of which senses the retracted position of one piston and the other of which senses both the retracted and the extended positions of the other piston.

5. A device according to claim 4, which includes means responsive to the sensors for monitoring that both pistons move in phase during normal working and that both pistons are stopped in their retracted positions.

6. A device according to claim 4, in which one sensor comprises a fixed light transmitter and receiver assembly cooperating with a flag or window of an element rotating with the respective motor, and the other sensor comprises a pair of fixed light transmitter and receiver assemblies cooperating with a flag or window of an element rotating with its respective motor.

7. A vortex mixing apparatus incorporating a driving device in accordance with claim 1.

8. A device according to claim 2, in which the driving means comprises two drive motors each arranged to drive a respective one of the pistons.

9. A device according to claim 8, in which each motor is associated with a respective optical sensor, one of which senses the retracted position of one piston and the other of which senses both the retracted and the extended positions of the other piston.

10. A device according to claim 9, in which one sensor comprises a fixed light transmitter and receiver assembly cooperating with a flag or window of an element rotating with the respective motor, and the other sensor comprises a pair of fixed light transmitter and receiver assemblies cooperating with a flag or window of an element rotating with its respective motor.

11. A vortex mixing apparatus incorporating a driving device in accordance with claim 10.

12. A device according to claim 3, in which each motor is associated with a respective optical sensor, one of which senses the retracted position of one piston and the other of which senses both the retracted and the extended positions of the other piston.

13. A device according to claim 12, in which one sensor comprises a fixed light transmitter and receiver assembly cooperating with a flag or window of an element rotating with the respective motor, and the other sensor comprises a pair of fixed light transmitter and receiver assemblies cooperating with a flag or window of an element rotating with its respective motor.

14. A device according to claim 5, in which one sensor comprises a fixed light transmitter and receiver assembly cooperating with a flag or window of an element rotating with the respective motor, and the other sensor comprises a pair of fixed light transmitter and receiver assemblies cooperating with a flag or window of an element rotating with its respective motor.

15. A vortex mixing apparatus incorporating a driving device in accordance with claim 14.

16. A vortex mixing apparatus incorporating a driving device in accordance with claim 2.

17. A vortex mixing apparatus incorporating a driving device in accordance with claim 3.

18. A vortex mixing apparatus incorporating a driving device in accordance with claim 4.

19. A vortex mixing apparatus incorporating a driving device in accordance with claim 5.

20. A vortex mixing apparatus incorporating a driving device in accordance with claim 6.

* * * * *